United States Patent
Hampel et al.

(10) Patent No.: US 8,466,244 B2
(45) Date of Patent: Jun. 18, 2013

(54) DISPERSANTS FOR HYDRAULICALLY SETTING SYSTEMS

(75) Inventors: Christina Hampel, Oberengstringen (CH); Jabbar Al Shemari, Zurich (CH); Ulf Velten, Oberengstringen (CH); Ueli Sulser, Unterengstringen (CH)

(73) Assignee: Sika Technology AG, Baar (CH)

( * ) Notice: Subject to any disclaimer, the term of this patent is extended or adjusted under 35 U.S.C. 154(b) by 322 days.

(21) Appl. No.: 12/739,602

(22) PCT Filed: Oct. 29, 2008

(86) PCT No.: PCT/EP2008/064624
§ 371 (c)(1),
(2), (4) Date: Apr. 23, 2010

(87) PCT Pub. No.: WO2009/056553
PCT Pub. Date: May 7, 2009

(65) Prior Publication Data
US 2010/0305238 A1    Dec. 2, 2010

(30) Foreign Application Priority Data
Oct. 29, 2007  (EP) .................................... 07119513

(51) Int. Cl.
*C04B 24/26* (2006.01)
*C08F 120/20* (2006.01)

(52) U.S. Cl.
USPC ............. 526/310; 524/2; 524/601; 526/329.7

(58) Field of Classification Search
USPC ............................ 526/310, 329.7; 524/2, 601
See application file for complete search history.

(56) References Cited

U.S. PATENT DOCUMENTS 4,272,607 A * 6/1981 Tsukada et al. ............ 430/288.1

FOREIGN PATENT DOCUMENTS

| | | |
|---|---|---|
| DE | 100 15 135 A1 | 10/2001 |
| EP | 0 604 676 A1 | 7/1994 |
| EP | 1 061 089 A1 | 12/2000 |
| EP | 1 138 697 A1 | 10/2001 |
| EP | 1 348 729 A1 | 10/2003 |
| FR | 2 851 937 | 9/2004 |
| GB | 764 021 A | 12/1956 |
| GB | 764021 * | 12/1956 |
| JP | A-2002-88323 | 3/2002 |
| JP | A-2003-003136 | 1/2003 |
| WO | WO 95/09821 A2 | 4/1995 |
| WO | WO 97/35814 A1 | 10/1997 |
| WO | WO 2005/090416 A1 | 9/2005 |

OTHER PUBLICATIONS

International Search Report issued in International Patent Application No. PCT/EP2008/064624, on Dec. 19, 2008, (with English Translation).
International Report on Patentability issued in International Patent Application No. PCT/EP2008/064624 dated Jun. 29, 2010.
International Preliminary Report on Patentability issued in International Patent Application No. PCT/EP2008/064624 on Jun. 29, 2010.
Sep. 25, 2012 Japanese Office Action issued in 2010-531514 (with English Translation).

\* cited by examiner

*Primary Examiner* — Ling Choi
*Assistant Examiner* — Chun-Cheng Wang
(74) *Attorney, Agent, or Firm* — Oliff & Berridge, PLC

(57) ABSTRACT

The present invention relates to polymers P as dispersants, in particular as liquefiers, for hydraulically setting systems, and hydraulically setting systems comprising the polymer P. The polymer P comprises at least one acid unit, at least one ester unit, at least one unit containing a tetrahydrofurfuryl group, and optionally at least one amide unit.

22 Claims, No Drawings

DISPERSANTS FOR HYDRAULICALLY SETTING SYSTEMS

FIELD OF THE INVENTION

The present invention relates to the area of admixtures for hydraulically setting systems, in particular of dispersants for concrete compositions.

PRIOR ART

Polymers of α-β-unsaturated carboxylic acids having polyalkylene glycol side chains have been used for a relatively long time in concrete technology as dispersants, in particular as plasticizers, owing to their pronounced water reduction. These polymers have a comb polymer structure. There is a number of such comb polymers which also have amide groups in addition to ester and carboxyl groups.

In spite of the improvement regarding the plasticization, however, it is still a challenge to adapt to the various requirements of the building sites worldwide. This is due to the various types of climate, cements, aggregates, cement replacement fillers, etc., and the broad field of use, such as ready-mix concrete, air-placed concrete, self-compacting concrete or concrete mixed on site, where the additives must from time to time meet completely different requirements.

New admixtures which can be used as dispersants, in particular as plasticizers for hydraulically setting systems are therefore constantly being searched for. The problem with the known comb polymers which can be used as plasticizers is moreover that, owing to the comblike surfactant structure of these polymers, a considerable amount of air can, on incorporation, be introduced into mineral construction materials. Such air voids result in the formation of cavities in the concrete, which can lead to a deterioration in the mechanical properties and durability of the concrete.

The known concrete dispersants moreover often achieve plasticizing results which are satisfactory only in concrete and are suitable only to a limited extent for gypsum compositions. In gypsum, they achieve only relatively little plasticization and must therefore be used in high doses or they have such a strong retardant effect that the gypsum composition scarcely sets. For example, melamine- and naphthalene-sulfonic acid-formaldehyde condensates have been used to date as gypsum plasticizers. These plasticizers are, however, ecologically problematic and therefore not desired, owing to the release of toxic formaldehyde.

There is therefore the need to be able to prepare polymers which firstly show a sufficient plasticizing effect both in concrete compositions and in gypsum compositions and secondly introduce a small amount of air voids into hydraulically setting systems.

SUMMARY OF THE INVENTION

It is therefore an object of the present invention to provide dispersants in the case of which the disadvantages of the prior art are overcome and which are suitable for achieving a sufficient plasticizing effect of hydraulically setting compositions, in particular of concrete and gypsum.

Surprisingly, it was found that this can be achieved by a polymer P as claimed in claim 1. It has now surprisingly been found that a polymer P which comprises at least one acid unit, at least one ester unit, at least one unit which contains a tetrahydrofurfuryl group, and optionally at least one amide unit is outstandingly suitable for dispersing or plasticizing different hydraulically setting compositions without it having to be used in a large amount. This permits both economical and ecological use of the polymer according to the invention.

The invention moreover comprises the use of the polymers P according to the invention as plasticizers for hydraulically setting compositions and as dispersants for aqueous dispersions. Moreover, the invention comprises a binder-containing mixture comprising at least one binder and at least one polymer P, and the preparation of such binder-containing mixtures. Further advantageous configurations of the invention are evident from the subclaims.

PREFERRED EMBODIMENTS OF THE INVENTION

The present invention relates to a polymer P having ester groups and comprising (a) at least one structural unit A of the formula (I);

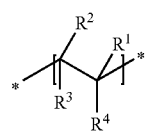

(I)

(b) at least one structural unit B of the formula (II);

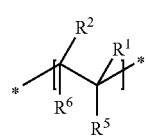

(II)

(c) at least one structural unit C of the formula (III);

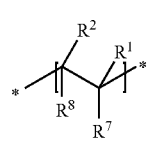

(III)

optionally
(d) at least one structural unit D of the formula (IV);

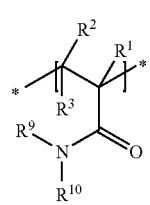

(IV)

and optionally
(e) at least one further structural unit E.

$R^1$ is H, $CH_2COOM$ or an alkyl group having 1 to 5 carbon atoms, in particular H or $CH_3$; $R^2$ is H, an alkyl group having 1 to 5 carbon atoms, COOM or $CH_2COOM$, in particular H; $R^3$ is H, $CH_3$, COOM or $CH_2COOM$, in particular H; and $R^4$ is COOM; or $R^3$ together with $R^4$ may form a ring as —CO—O—CO—.

M is H, a $C_1$-$C_5$ alkyl radical, alkali metal, alkaline earth metal or other di- or trivalent metal atoms, ammonium, ammonium cation, an organic ammonium group or a mixture thereof. M may be in particular a cation, in particular $H^+$, $Na^+$, $Ca^{++}/2$, $Mg^{++}/2$, $NH_4^+$ or an organic ammonium. It is clear to the person skilled in the art that, in the case of the polyvalent ions, a further counterion which may be, inter alia, also a carboxylate thereof or another molecule of the polymer P must be present. The ammonium compounds are in particular tetraalkylammonium or $HR_3N^+$, R being an alkyl group, in particular a $C_1$- to $C_6$-alkyl group, preferably ethyl or butyl. Ammonium ions are obtained in particular by neutralizing the carboxyl group with commercially available tertiary amines.

A polymer P in which $R^1$ is $CH_3$ and $R^2$, $R^3$ and M are H is particularly preferred.

$R^5$, independently of one another, is

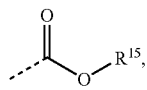

$R^{15}$ being $-[(R^{11}O)_x-(R^{12}O)_y-(R^{13}O)_z]-R^{14}$, and $R^{11}$, $R^{12}$ and $R^{13}$, in each case independently of one another, being a $C_2$-$C_4$ alkylene group with an order of the $(R^{11}O)$, $(R^{12}O)$ and $(R^{13}O)$ units in any possible sequence. $R^{14}$ is H, a $C_1$-$C_{12}$ alkyl or cycloalkyl radical, a $C_7$-$C_{20}$ alkylaryl or aralkyl radical, or a substituted or unsubstituted aryl radical, and x, y, z, independently of one another, each have the values 0-250 and x+y+z=3-250.

$R^6$, independently of one another, is H, $CH_3$, COOM, $CH_2COOM$ or a substituent as defined for $R^5$ or $R^7$. Preferably, $R^6$ is H.

$R^7$, independently of one another, is a radical of the formula (V):

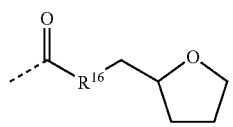

in which $R^{16}$, independently of one another, is NH, $-NH-(R^{17})_q-$, O, or $-O-(R^{18})_s-$, $R^{17}$ and $R^{18}$, in each case independently of one another, are a $C_1$-$C_{12}$ alkylene group or one or more $C_2$-$C_4$ oxyalkylene groups with an order in any possible sequence; in which q, independently of one another, is an integer and has the value 1 if $R^{17}$ is a $C_1$-$C_{12}$ alkylene group and in each case has the value 1-150 if $R^{17}$ is one or more $C_2$-$C_4$ oxyalkylene groups; and in which s, independently of one another, is an integer and has the value 1 if $R^{18}$ is a $C_1$-$C_{12}$ alkylene group and in each case has the value 1-150 if $R^{18}$ is one or more $C_2$-$C_4$ oxyalkylene groups.

$R^8$, independently of one another, is H, $CH_3$, COOM, $CH_2COOM$ or a substituent as defined for $R^8$ or $R^7$. Preferably, $R^8$ is H.

$R^9$ and $R^{10}$ together may form a ring which optionally contains oxygen, sulfur or further nitrogen atoms, or $R^9$ and $R^{10}$, independently of one another, are H, a $C_1$-$C_{20}$ alkyl group, a $C_5$-$C_9$ cycloalkyl group, a $C_7$-$C_{12}$ aralkyl group, a hydroxyalkyl group or a compound of the formula (VI), (VII) or (VIII)

 (VI)

 (VII)

 (VIII)

$R^{19}$, independently of one another, being an alkylene group and $R^{20}$ independently of one another, being a $C_1$- to $C_4$-alkyl group, and X, independently of one another, being an S, O or N, where r=1 if X=S or O, or r=2 if X=N; $R^{21}$ being an alkylene group optionally having heteroatoms and, together with the nitrogen atom, forming a 5-membered to 8-membered ring, in particular 6-membered ring; and $R^{11'}$, $R^{12'}$ and $R^{13'}$, in each case independently of one another, being a $C_2$-$C_4$ alkylene group with an order of the $(R^{11'}O)$, $(R^{12'}O)$ and $(R^{13'}O)$ units in any possible sequence; and $R^{14'}$ being a $C_1$-$C_{12}$ alkyl or cycloalkyl radical, a $C_7$-$C_{20}$ alkylaryl or aralkyl radical, or a substituted or unsubstituted aryl radical. $R^9$ may be both radicals as are defined for $R^{9'}$ in the formula (XI) and radicals as are defined for $R^{9''}$ in the formula (XI'). Likewise, $R^{10}$ may be both radicals as are defined for $R^{10'}$ in the formula (XI) and radicals as are defined for $R^{10''}$ in the formula (XI').

The indices x', y', z', independently of one another, each have the values 0-100 and x'+y'+z'=1-100.

In a preferred embodiment, in the polymer P, the radical $R^1$ is H or $CH_3$, the radicals $R^2$, $R^3$ and M as well as preferably $R^6$ and $R^8$ are H.

The structural unit A of the formula (I) is therefore preferably a methacrylic acid unit or an acrylic acid unit or analogs thereof. Particularly good results were obtained if the structural unit A of the formula (I) is a methacrylic acid unit.

For $R^{15}$ in the polymer P, the order of $(R^{11}O)$, $(R^{12}O)$ and $(R^{13}O)$ is preferably random, alternating or blockwise and $(R^{11}O)\neq(R^{12}O)\neq(R^{13}O)$. Preferably, $R^{11}$, independently of one another, is a $C_2$-alkylene group, $R^{12}$, independently of one another, is a $C_3$-alkylene group and $R^{13}$, independently of one another, is a $C_4$-alkylene group.

In a preferred polymer P, at least 30 mol %, particularly preferably 50-100 mol %, even more preferably 80-100 mol %, most preferably 100 mol %, of the structural unit B of the formula (II) is represented by a structure in which $R^{11}$ is a $C_2$-alkylene group, y=0 and z=0. This means that $R^{15}$ preferably comprises at least 30 mol % of $(R^{11}O)$ units, preferably from 50 to 100 mol % of $(R^{11}O)$ units, even more preferably from 80 to 100 mol % of $(R^{11}O)$ units, based on the total molar amount of all $(R^{11}O)$, $(R^{12}O)$ and $(R^{13}O)$ units. Particularly preferably, $R^{16}$ comprises 100 mol % of $(R^{11}O)$ units, based on the total molar amount of all $(R^{11}O)$, $(R^{12}O)$ and $(R^{13}O)$ units. Depending on the process for the preparation of the polymer P, $R^{14}$ may be H, a $C_1$-$C_{12}$ alkyl or cycloalkyl radical, a $C_7$-$C_{20}$ alkylaryl or aralkyl radical, or a substituted or unsubstituted aryl radical. If the polymer P is prepared via the polymer-analogous reaction, $R^{14}$ is preferably $R^{14''}$, in particular a methyl radical, and is not a hydrogen atom.

The structural unit C contains one or two tetrahydrofurfuryl compounds. $R^7$ is a radical of the formula (V), in which $R^{16}$ is preferably O or NH. Also particularly suitable is a compound in which $R^{16}$ is $OR^{18}$ and $R^{18}$ is $-(CH_2CH_2O)_2-$. $R^8$ may likewise be a radical of the formula (V). $R^8$ is preferably H.

The radicals $R^{11'}$, $R^{12'}$ and $R^{13'}$ or $(R^{11'}O)$, $(R^{12'}O)$ and $(R^{13'}O)$ are, independently of one another, substituents as are defined for $R^{11}$, $R^{12}$ and $R^{13}$ or for $(R^{11}O)$, $(R^{12}O)$ and $(R^{13}O)$ respectively.

In the case of a preferred polymer P, the structural unit D of the formula (IV) is represented by a structure in which $R^9$ is H and $R^{10}$ is a compound of the formula (VIII), z being 0, $R^{11'}$ being a $C_2$-alkylene group and $R^{12'}$ being a $C_3$-alkylene group. This means that $R^{16}$ preferably comprises at least 30 mol % of $(R^{11'}O)$ units, preferably from 50 to 80 mol % of $(R^{11'}O)$ units, even more preferably from 60 to 80 mol % of $(R^{11'}O)$ units, and at least 5 mol % of $(R^{12'}O)$ units, preferably from 10 to 50 mol % of $(R^{12'}O)$ units, even more preferably from 20 to 40 mol % of $(R^{12'}O)$ units, based on the total molar amount of all $(R^{11'}O)$ and $(R^{12'}O)$ units. Particularly preferably, $R^{10}$ comprises at least 70 mol % of $(R^{11'}O)$ units and not more than 30 mol % of $(R^{12'}O)$ units, based on the total molar amount of all $(R^{11'}O)$, $(R^{12'}O)$ and $(R^{13'}O)$ units.

The further structural unit E may be a further amide or ester unit. For example, the structural unit E may be an ester unit which is prepared by reacting a mono- or dicarboxylic acid with an alkyl alcohol, in particular a $C_6$-$C_{20}$ alkyl alcohol.

A particularly preferred polymer P comprises or consists of a) at least one structural unit A of the formula (I');

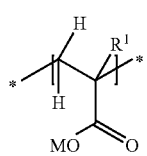
(I')

b) at least one structural unit B of the formula (II');

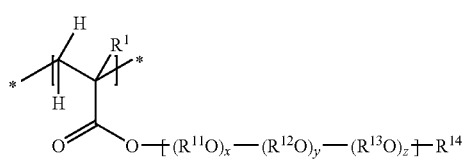
(II')

and c) at least one structural unit C of the formula (III');

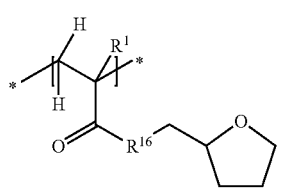
(III')

$R^1$ being H or an alkyl radical, preferably a methyl radical,

M being an $H^+$, $Na^+$, $Ca^{++}/2$, $Mg^{++}/2$, $NH_4^+$ or an organic ammonium, preferably an $H^+$, $R^{11}$ being an ethylene group, $R^{12}$ being a propylene group, $R^{13}$ being a butylene group, $R^{14}$ being a $C_1$ to $C_{12}$ alkyl group, preferably a methyl group, $R^{16}$ being O or NH, preferably O, and x being 1-250, preferably from 10 to 100, y being 0-250, preferably from 0 to 50, z being from 0 to 100, preferably 0.

The polymer P may have a combination of different structural units of the respective structural units of A, B, C and optionally D and E. For example, a plurality of structural units A may occur as a mixture in the polymer P, for example a mixture of methacrylic acid units with acrylic acid units. Alternatively, a plurality of ester units B may occur as a mixture in the polymer P, for example a plurality of ester units B having different substituents $R^{15}$. For example, the joint use of polyalkylene glycols, in particular of polyethylene glycols with polypropylene glycols, or the joint use of polyalkylene glycols, in particular of polyethylene glycols, having different molecular weights is preferred. It is also possible for a plurality of amide units D to be present in the polymer P, in particular the combination of at least one unit D with $R^{9'}$ and $R^{10'}$ as radicals $R^9$ and $R^{10}$ with at least one unit D with $R^{9''}$ and $R^{10''}$ as radicals $R^9$ and $R^{10}$.

In a preferred embodiment, the polymer P comprises from 5 to 95 mol %, preferably from 20 to 80 mol %, of the structural unit A of the formula (I), from 1 to 90 mol %, preferably from 15 to 70 mol %, of the structural unit B of the formula (II), from 0.001 to 10 mol %, preferably from 0.01 to 6 mol %, particularly preferably from 0.1 to 5 mol %, of the structural unit C of the formula (III), optionally from 0 to 30 mol %, preferably from 0 to 1 mol %, of the structural unit D of the formula (IV), and optionally from 0 to 30 mol %, preferably from 0 to 1 mol %, of the structural unit E, based in each case on the total molar amount of the structural units of A, B, C, D and E in the polymer P.

The sequence of the individual structural units A, B, C, D and E in the polymer P may be alternating, statistical, blockwise or random.

The polymer P preferably has a molecular weight $M_w$ in the range of 1000-150 000 g/mol, preferably 1000-80 000 g/mol, particularly preferably 10 000-50 000 g/mol, and is preferably composed of from 10 to 500, preferably from 20 to 200, in particular from 25 to 60, structural units.

The polymer P can be prepared in various ways. Substantially three processes are in use. In a first process, the polymers are prepared in a so-called polymer-analogous reaction from a polycarboxyl polymer and the respective alcohols and optionally amines. In a second process, anhydride groups are also formed in addition to ester and possibly amide groups in the polymer-analogous reaction in the first step, and the anhydride groups formed in the first step are reacted with an amine compound to give an amide in a second step. In a third process, the polymers are prepared from the respective unsaturated carboxylic acid-, ester- and amide-functional monomers by free radical polymerization.

Particularly preferred polymers are prepared by the polymer-analogous reaction according to the first process. The polymer-analogous reaction has the major advantage that very different comb polymers having very different properties can be obtained in a simple and reliable manner from commercially available polymers of α-,β-unsaturated mono- or dicarboxylic acids, especially from poly(meth)acrylic acids, by varying the amount, the type and the ratio of alcohol and optionally amine. Such polymer-analogous reactions are described, for example, in WO97/35814A1, WO95/09821A2, DE 100 15 135A1, EP 1138697A1 and EP1348729A1. Details of the polymer-analogous reaction are disclosed, for example, in EP 1 138 697 B1, on page 7, line 20 to page 8, line 50, and in the examples thereof, or in EP 1 061 089 B1, on page 4, line 54 to page 5, line 38, and in the examples thereof. Polymer P can also be obtained in the solid state of aggregation, as described in EP 1 348 729 A1, on page 3 to page 5 and in the examples thereof.

A polymer P is therefore preferably used, the polymer P being obtainable by the reaction of (a) at least one polycarboxylic acid or analog of a polycarboxylic acid; and (b) at least one monohydroxy compound F of the formula (IX)

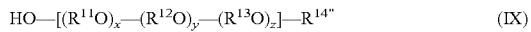

and (c) at least one tetrahydrofurfuryl (THF) compound G of the formula (X)

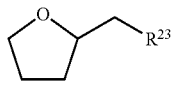

and optionally (d) at least one amine compound H of the formula (XI)

and optionally (e) at least one further compound J.

The individual compounds are used in the preparation preferably in an amount such that from 1 to 90 mol %, preferably from 15 to 70 mol %, of at least one monohydroxy compound F of the formula (IX), from 0.001 to 10 mol %, preferably from 0.01 to 6 mol %, particularly preferably from 0.1 to 5 mol %, of at least one THF compound G of the formula (X), optionally from 0 to 30 mol %, preferably from 0 to 1 mol %, of at least one amine compound H of the formula (XI), and optionally from 0 to 30 mol %, preferably from 0 to 1 mol %, of at least one further compound J, based in each case on 1 mol of polycarboxylic acid units, are used based on 1 mol of units of at least one polycarboxylic acid or an analog of a polycarboxylic acid.

Polycarboxylic acid or analog of a polycarboxylic acid is understood as meaning a homo- or copolymer which can be obtained by polymerization of at least one monomer a and optionally at least one monomer b. Monomer a is selected from the group consisting of unsaturated monocarboxylic acids, unsaturated dicarboxylic acids, analogs thereof and mixtures thereof. Unsaturated mono- or dicarboxylic acids preferably comprise maleic acid, itaconic acid, fumaric acid, citraconic acid, glutaconic acid, mesaconic acid or crotonic acid, in particular acrylic acid or methacrylic acid. Analog of a mono- or dicarboxylic acid or polycarboxylic acid is understood in the context of the present invention as meaning acid salts, acid halides, acid anhydrides and acid esters, in particular alkyl acid esters.

Monomer b is preferably selected from the group consisting of ethylenically unsaturated monomers comprising α-β-unsaturated mono- or dicarboxylic acids, α-β-unsaturated mono- or dicarboxylic acid esters, styrene, ethylene, propylene, vinyl acetate, in particular methacrylic acid, acrylic acid, crotonic acid, itaconic acid, maleic acid, fumaric acid, and the salts, esters and mixtures thereof.

A copolymer of acrylic acid and methacrylic acid and salts or partial salts thereof are preferred as the copolymer.

Polymethacrylic acid or polyacrylic acid, in particular polymethacrylic acid or the salts or partial salts thereof are preferred as the homopolymer.

The polycarboxylic acid and the analog of the polycarboxylic acid may be present here as free acid or as partial salt, the term "salt" here and below comprising not only the classical salts as are obtained by neutralization with a base but also complex chemical compounds between metal ions and the carboxylate or carboxyl groups as ligands. In the preparation of the polycarboxylic acid or of the analog of the polycarboxylic acid, any initiators, coinitiators and chain-transfer agents used are, if required, chosen so that preferably no reactive hydroxyl or amine functions are present in polymer P.

"Monohydroxy compound" is understood here and below as meaning a substance which has only one free hydroxyl group.

"Monoamine compound" is understood here and below as meaning a substance which has only one free amino group, or ammonia as a gas or as an aqueous solution.

"Molecular weight" is understood in the context of the invention as meaning the weight-average molecular weight $M_w$.

"(Meth)acrylic acid" is understood throughout the present document as meaning both acrylic acid and methacrylic acid.

The homo- or copolymer of the polycarboxylic acid or of the analog of the polycarboxylic acid is obtained by free radical polymerization by customary processes. It can be effected in solvents, preferably in water, or in the absence of a solvent. This free radical polymerization is preferably effected in the presence of at least one chain-transfer agent, in particular an inorganic or organic sulfur compound, such as, for example, mercaptans, or of a phosphorus compound. The polymerization is advantageously effected under conditions such that the homo- or copolymer formed is composed of from 10 to 500, preferably from 20 to 200, more preferably from 25 to 60, monomer building blocks. Such homo- or copolymers of (meth)acrylic acid are commercially available. The homo- or copolymer of the polycarboxylic acid or of the analog of the polycarboxylic acid preferably has a molecular weight $M_w$ of from 500 to 20 000 g/mol, preferably from 1000 to 15 000 g/mol, particularly preferably form 1500 to 8000 g/mol.

The monohydroxy compound F is preferably terminated at one end with terminal groups which are not reactive under customary reaction conditions. Here, it is preferably a polymer having a polyalkylene glycol skeleton. The monohydroxy compound F has the formula (IX)

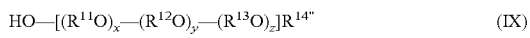

$R^{11}$, $R^{12}$ and $R^{13}$, in each case independently of one another, being a $C_2$-$C_4$ alkylene group with an order of the ($R^{11}$O), ($R^{12}$O) and ($R^{13}$O) units in any possible sequence; $R^{14"}$ being a $C_1$-$C_{12}$ alkyl or cycloalkyl radical, a $C_7$-$C_{20}$ alkylaryl or aralkyl radical or a substituted or unsubstituted aryl radical; and x, y, z, independently of one another, in each case having the values 0-250 and x+y+z being 3-250.

Monohydroxy compounds F of the formula (IX) having a methyl, ethyl, isopropyl or n-butyl group, in particular having a methyl group, as substituent $R^{14"}$ and having z=0 are preferred. Preferably, $R^{11}$, independently of one another, is a $C_2$-alkylene group and $R^{12}$, independently of one another, is a $C_3$-alkylene group. Preferably, F are copolymers of ethylene oxide/propylene oxide, more preferably polyethylene glycol endcapped at one end.

Mixtures of a plurality of different compounds of group F are likewise possible. Thus, for example, polyethylene glycols endcapped at one end and having different molecular weights can be mixed, or, for example, mixtures of polyethylene glycols endcapped at one end with copolymers of ethylene oxide and propylene oxide which are endcapped at one end or polypropylene glycols endcapped at one end can be used. Preferably, the polyalkylene glycol is endcapped at one end with a methyl group. Polyethylene glycol monomethyl ether is particularly preferred as hydroxy compound F.

In the context of the invention, "terminated with terminal groups which are not reactive under customary reaction conditions" is understood as meaning that, instead of functional groups reactive for the esterification or amidation, those groups are present which are no longer capable of reaction. The customary reaction conditions are those which are known to the person skilled in the art for esterifications and amidations. Compounds "terminated at one end" means that only one end is no longer capable of reaction.

The molecular weight of the at least one hydroxy compound F of the formula (IX) is about 120-20 000 g/mol, in particular about 250-10 000 g/mol. In a preferred embodiment, the monohydroxy compound F is a polyalkylene glycol endcapped at one end, in particular a polyethylene glycol or polypropylene glycol, having a molecular weight $M_w$ of from 300 to 10 000 g/mol, in particular from 500 to 5000 g/mol, preferably from 800 to 3000 g/mol. A mixture of polyalkylene glycols endcapped at one end and having different molecular weights is also particularly suitable, for example the mixture of polyalkylene glycols having a molecular weight of 1000 g/mol with polyalkylene glycols having a molecular weight of 3000 g/mol.

The tetrahydrofurfuryl (THF) compound G has the formula (X).

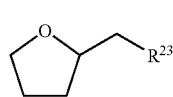
(X)

Here, $R^{23}$, independently of one another, is —$NH_2$, —$(R^{17})_q$—$NH_2$, —OH or —$(R^{18})_s$—OH, and $R^{17}$ and $R^{18}$, in each case independently of one another, are a $C_1$-$C_{12}$ alkylene group or one or more $C_2$-$C_4$ oxyalkylene groups with an order in any possible sequence. The index q, independently of one another, is an integer and has the value 1 if $R^{17}$ is a $C_1$-$C_{12}$ alkylene group and has in each case the value 1-150 if $R^{17}$ is one or more $C_2$-$C_4$ oxyalkylene groups. The index s, independently of one another, is an integer and has the value 1 if $R^{18}$ is a $C_1$-$C_{12}$ alkylene group and in each case has the value 1-150 if $R^{18}$ is one or more $C_2$-$C_4$ oxyalkylene groups. Preferably, $R^{23}$ is —$NH_2$ or —OH, particularly preferably —OH.

Examples of such THF compounds G are tetrahydrofurfuryl alcohol, tetrahydrofurfurylamine or tetrahydrofurfuryl (poly)alkylene glycol. Such compounds are commercially available, for example from Fluka, Switzerland. Various alkoxylated THF compounds can be obtained from companies specializing in alkoxylation.

Good results are achieved if THF—OH or THF—$NH_2$ was used as the THF compound G. THF—OH is very particularly preferred.

In addition to the monohydroxy compound F and the tetrahydrofurfuryl compound G, an amine compound H is optionally used in the first and optionally used in the second process. This results not only in the formation of ester groups but also in the formation of amide groups. If the preparation of the polymer P is effected according to the first process by the so-called polymer-analogous reaction, the amine compound H preferably has a boiling point and flashpoint which is higher than the reaction temperature of the polycarboxylic acid with the monohydroxy compound F. Furthermore, the amine compound H preferably contains no hydroxyl groups.

Typical examples of such amine compounds H can be represented by the formula (XI)

(XI)

Firstly, $R^{9'}$ and $R^{10'}$ together may form a ring which optionally contains oxygen, sulfur or further nitrogen atoms.

Examples of such amine compounds H are in particular 9H-carbazole, indoline or imidazole.

Secondly, $R^{9'}$ and $R^{10'}$, independently of one another, may be H, a $C_8$-$C_{20}$ alkyl group, a $C_5$-$C_9$ cycloalkyl group, a $C_7$-$C_{12}$ aralkyl group or a compound of the formula (VI), (VII) or (VIII).

(VI)

(VII)

(VIII)

Here, $R^{19}$, independently of one another, is an alkylene group, preferably a $C_1$- to $C_4$-alkylene group, and $R^{20}$, independently of one another, is a $C_1$- to $C_4$-alkyl group. X, independently of one another, is an S, 4 or N, where r=1 if X=S or O, and r=2 if X is N. $R^{21}$ is an alkylene group optionally having heteroatoms and, together with the nitrogen atom, forms a 5-membered to 8-membered ring, in particular 6-membered ring.

The substituents $R^{11'}$, $R^{12'}$, and $R^{14'}$ or the indices x', y' and z', independently of one another, have the same meanings as were already defined above.

Examples of such amine compounds H are dioctylamine, distearylamine, di-tallow-fatty amine, fatty amines such as stearylamine, coconut fatty amine, octadecylamine, tallow fatty amine, oleylamine, 3-butoxypropylamine, bis(2-methoxyethyl)amine; α-methoxy-ω-amino-polyoxyethylene, α-methoxy-ω-aminopolyoxypropylene, α-methoxy-ω-aminooxyethylene-oxypropylene copolymer.

Preferably, the amine compound H is a primary monoamine. α-Methoxy-ω-aminooxyethylene-oxypropylene copolymers, such as, for example, Jeffamine® M-2070, or α-methoxy-ω-aminopolyoxyethylenes, and other monoamines which are marketed, for example, by Huntsman under the name Jeffamine® of the M series, and mixtures thereof are particularly preferred as monoamine compounds H. Most preferred are α-methoxy-ω-aminooxyethylene-oxypropylene copolymers. Such monoamine compounds H are obtainable, for example, from a polymerization of ethylene oxide and/or propylene oxide started with alcohol, followed by conversion of the terminal alcohol group into an amine group.

A preferred further compound J is a compound which can undergo a reaction with the polycarboxylic acid or the analog of the polycarboxylic acid. Examples of a compound J are further amines or alcohols, for example a $C_6$-$C_{20}$ alkyl alcohol or a further mono- or diamine. It is also possible to use a plurality of different compounds J.

The reaction of the polycarboxylic acid or the analog of the polycarboxylic acid with at least one monohydroxy compound F of the formula (IX) and at least one tetrahydrofurfuryl compound G of the formula (X) and optionally at least one amine compound H of the formula (XI) and optionally at least one further compound J to give a polymer P is effected in the polymer-analogous reaction typically in a manner such that the at least one monohydroxy compound F is added to the polycarboxylic acid or to the analog of the polycarboxylic acid with stirring and is heated to the reaction temperature. The mixture is stirred at the reaction temperature described above, the at least one tetrahydrofurfuryl compound G of the formula (X) is added and reaction is effected possibly in vacuo or by passing a gas stream over or through the reaction mass. The temperature for this reaction is, for example, from 140° C. to 200° C. However, the reaction is also possible at temperatures from 150° C. to 175° C. if an amine compound H is used, the addition thereof can be effected simultaneously with the monohydroxy compound E or at a later time during this reaction step.

In a preferred embodiment, this reaction is carried out in the presence of an esterification catalyst, in particular of an acid. Such an acid is preferably sulfuric acid, p-toluenesulfonic acid, benzenesulfonic acid, methanesulfonic acid, phosphoric acid or phosphorous acid. Sulfuric acid is preferred. The removal of the water from the reaction mixture can be effected under atmospheric pressure but also in vacuo. Moreover, a gas stream can be passed over or through the reaction mixture. Air or nitrogen can be used as the gas stream.

The reaction can be monitored by means of measurement of the acid number, for example by titration, and can be stopped at a desired acid number so that the desired ratio of carboxylic acid to ester or amide groups is achieved. The reaction is stopped by eliminating the vacuum and cooling.

In a preferred embodiment, a polymethacrylic acid is esterified with a polyethylene glycol which is terminated at one end with a methoxy group, and reacted with a tetrahydrofurfuryl compound, in particular a THF alcohol or THF amine.

In a second process, anhydride groups are also formed in addition to ester groups and optionally amide groups according to the so-called polymer-analogous reaction in a first step and the anhydride groups formed in the first step are completely or partly converted with an amine compound into an amide in a second step. Such processes are described, for example, in WO2005/090416A1.

The first step is preferably effected as in the preparation process described for the polymer-analogous reaction.

If amine compounds have already been used in the first step of the second process, in particular amine compounds as described for the amine compound H are preferred.

In this case, the amine compound H has a boiling point and flashpoint which is higher than the reaction temperature of the first step. Furthermore, the amine compound H is not permitted to contain hydroxyl groups.

Preferably, no amines are used in the first step.

In a second step of the second process, the polymer which is formed in the first step and has anhydride groups in addition to ester groups and optionally amide groups is reacted with an amine compound H' at temperatures substantially below 100°, preferably below 60° C., preferably below 40° C., to give the amide. Preferably, the reaction is effected at from 10° C. to 60° C., particularly preferably from 15 to 40° C., even more preferably from 20 to 30° C. This reaction can be realized under mild conditions and requires no vacuum, so that amine compounds H' having a low boiling point or amine compounds H' which also contain hydroxyl groups in addition to the amino group can also be used.

If the preparation of the polymer P is effected by this second process, typical examples of suitable amine compounds H' for the second step can be represented by the formula (XI').

Firstly, $R^{9''}$ and $R^{10''}$ together may form a ring which optionally contains oxygen, sulfur or further nitrogen atoms. Examples of such amine compounds H' are in particular 9H-carbazole, indoline, piperidine, morpholine, pyrrolidine, 1,3-thiazolidine, 2,3-dihydro-1,3-thiazole, imidazole. Morpholine is particularly suitable.

Secondly, $R^{9''}$ and $R^{10''}$, independently of one another, may be H, a $C_1$-$C_{12}$ alkyl group, a $C_5$-$C_9$ cycloalkyl group, a $C_7$-$C_{12}$ aralkyl group, a hydroxyalkyl group, in particular —CH$_2$CH$_2$—OH or —CH$_2$CH(OH)CH$_3$, or a compound of the formula (VI), (VII) or (VIII).

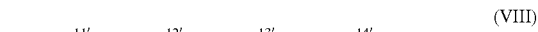

Here, $R^{19}$, independently of one another, is an alkylene group, preferably a $C_1$- to $C_4$-alkylene group, and $R^{20}$, independently of one another, is a $C_1$- to $C_4$-alkyl group. X, independently of one another, is an S, O or N, where r=1 if X=S or O or r=2 if X=N. $R^{21}$ is an alkylene group optionally having heteroatoms and, together with the nitrogen atom, forms a 5-membered to 8-membered ring, in particular a 6-membered ring.

The substituents $R^{11'}$, $R^{12'}$ and $R^{14'}$ or the indices x', y' and z', independently of one another, have the same meanings as have already been defined above.

A preferred hydroxyalkyl group is the group —CH$_2$CH$_2$—OH or —CH$_2$CH(OH)CH$_3$.

Suitable amine compounds H' are, for example, ammonia, butylamine, hexylamine, octylamine, decylamine, diethylamine, dibutylamine, dihexylamine, cyclopentylamine, cyclohexylamine, cycloheptylamine and cyclooctylamine, dicyclohexylamine; 2-phenylethylamine, benzylamine, xylylamine; N,N-di-methylethylenediamine, N,N-diethylethylenediamine, 3,3'-iminobis(N,N-di-methylpropylamine), N,N-dimethyl-1,3-propanediamine, N,N-diethyl-1,3-propanediamine, N,N,N'-trimethylethylenediamine, 2-methoxyethylamine, 3-methoxypropylamine; ethanolamine, isopropanolamine, 2-aminopropanol, diethanolamine, diisopropanolamine, N-isopropylethanolamine, N-ethylethanolamine, N-butylethanolamine, N-methylethanolamine, 2-(2-amino-ethoxy)ethanol; 1-(2-aminoethyl)piperazine, 2-morpholinoethylamine, 3-morpholinopropylamine.

The amine compound H' is particularly preferably selected from the group consisting of morpholine, 2-morpholin-4-ylethylamine, 2-morpholin-4-ylpropylamine, N,N-dimethylaminopropylamine, ethanolamine, diethanolamine, 2-(2-aminoethoxy)ethanol, dicyclohexylamine, benzylamine, 2-phenyl-ethylamine, N-(2-hydroxyethyl)ethylenediamine, and other amines which are marketed, for example, by Huntsman under the name Jeffamine® of the M series, and mixtures thereof.

In a third preparation process, the polymer P is prepared via free radical polymerization. The route via free radical polymerization is the commonest method but is complicated in the case of specific compounds by the commercial availability of the corresponding monomers and requires complicated process control.

The invention therefore additionally relates to a polymer P which is obtainable by the polymerization reaction, in the presence of at least one free radical initiator, of (a) at least one ethylenically unsaturated mono- or dicarboxylic acid M or an analog of an unsaturated mono- or dicarboxylic acid; with (b) at least one ethylenically unsaturated carboxylic acid derivative K of the formula (XIII);

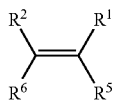

(XIII)

and (c) at least one second ethylenically unsaturated carboxylic acid derivative L of the formula (XIV);

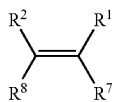

(XIV)

and optionally (d) at least one third ethylenically unsaturated carboxylic acid derivative N of the formula (XV);

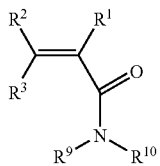

(XV)

and optionally (e) at least one further ethylenically unsaturated compound Q.

In the preparation via the free radical polymerization, the individual monomers are preferably in an amount of from 5 to 95 mol %, preferably from 20 to 80 mol %, of at least one mono- or dicarboxylic acid M, from 1 to 90 mol %, preferably from 15 to 70 mol %, of at least one ethylenically unsaturated carboxylic acid derivative K of the formula (XIII), from 0.001 to 10 mol %, preferably from 0.01 to 6 mol %, particularly preferably from 0.1 to 5 mol %, of at least one second ethylenically unsaturated carboxylic acid derivative L of the formula (XIV), optionally from 0 to 30 mol %, preferably from 0 to 1 mol %, of at least one third ethylenically unsaturated carboxylic acid derivative N of the formula (XV) and optionally from 0 to 30 mol %, preferably from 0 to 1 mol %, of at least one further ethylenically unsaturated compound Q, based in each case on the total molar amount of the monomers M, K, L, N and Q.

The substituents $R^1$, $R^2$, $R^3$, $R^5$, $R^6$, $R^7$, $R^8$, $R^9$ and $R^{10}$, independently of one another, each have the same meanings as have already been described for the formula (II), (III) or (IV).

The ethylenically unsaturated mono- or dicarboxylic acid M or the analog of the unsaturated mono- or dicarboxylic acid is preferably maleic acid, itaconic acid, fumaric acid, citraconic acid, glutaconic acid, mesaconic acid or crotonic acid, in particular acrylic acid or methacrylic acid. Methacrylic acid is particularly preferred. In the context of the present invention, analog of a mono- or dicarboxylic acid is understood as meaning acid salts, acid halides, acid anhydrides or acid esters, in particular alkyl acid esters.

The at least one ethylenically unsaturated carboxylic acid derivative K of the formula (XIII) is preferably a carboxylic acid ester, particularly preferably an acrylic acid ester or a methacrylic acid ester. Examples of such esters are polyalkylene glycol (meth)acrylates. A plurality of monomers of the formula (XIII) having different substituents $R^5$ in combination with one another can be used. For example, the joint use of polyalkylene glycols, in particular polyethylene glycols, having different molecular weights is preferred.

The second ethylenically unsaturated carboxylic acid derivative K of the formula (XIV) is a carboxylic acid derivative which contains at least one tetrahydrofurfuryl compound. The tetrahydrofurfuryl compound is preferably a tetrahydrofurfuryl ester or a tetrahydrofurfurylamide. Esters or amides, in particular esters, of acrylic acid or methacrylic acid are particularly suitable. Tetrahydrofurfuryl methacrylate is particularly suitable.

The third ethylenically unsaturated carboxylic acid derivative N of the formula (XV) is a carboxamide. Amides of ethylenically unsaturated mono- or dicarboxylic acids with amine compounds H' of the formula (VIII'), in particular of monoamine compounds H of the formula (VIII), can be used as suitable carboxamides. Amides of (meth)acrylic acid are particularly preferred, preferably the polyoxyalkylene monoamides. Particularly preferred amide monomers are the alkylpolyalkylene glycol (meth)acrylamides, particularly preferably the methylpolyethylene glycol (meth)acrylamides, the methylpolyethylene glycol polypropylene glycol (meth)acrylamides or the methylpolypropylene glycol (meth)acrylamides. Examples of unsaturated carboxamides of amines of the formula (VIII') are preferably mono- or dihydroxyethyl(meth)acrylamide, mono- or dihydroxypropyl(meth)acrylamide, mono- or dicyclohexyl(meth)acrylamide or N-alkyl-N-hydroxyethyl-(meth)acrylamides or N-alkyl-N-hydroxypropyl(meth)acrylamides.

It is possible to use one or more of these unsaturated carboxamides.

The polymer P is used in different areas, in particular in concrete and cement technology or gypsum technology. The polymer P has a particularly good property as a dispersant, in particular as a plasticizer, for hydraulically setting compositions, i.e. the resulting mixture has significantly greater flow behavior in comparison with a composition without the dispersant, without the solidification being substantially retarded. The flow behavior is typically measured via the slump. On the other hand, it is possible to achieve mixtures which, with the same flow behavior, require significantly less water, so that the mechanical properties of the hardened hydraulically set composition are greatly enhanced.

In particular, the polymer P is suitable for use as a plasticizer for hydraulically setting compositions, in particular for concrete, mortar or gypsum. The polymer P is also suitable as a dispersant for aqueous dispersions.

In principle, all hydraulically setting substances known to the person skilled in the art in the area of concrete can be used as hydraulically setting systems or compositions. These are in particular hydraulic binders, such as cements, such as, for example, Portland cements or high-alumina cements and/or mixtures thereof with fly ashes, silica fume, slag, blast-furnace sands and limestone filler. Further hydraulically setting substances in the context of the present invention are gypsum, in the form of anhydrite or hemihydrate, or quicklime. A preferred hydraulically setting composition is cement. Furthermore, aggregates, such as sand, gravel, stones, quartz powder, chalks and, as additives, customary constituents, such as other concrete plasticizers, for example lignosulfonates, sulfonated naphthalene-formaldehyde condensates, sulfonated melamine-formaldehyde condensates or polycarboxylate ethers, accelerators, corrosion inhibitors, retardants, shrinkage reducers, antifoams or air-entraining agents are possible.

For the use according to the invention, the polymer P can be used both in liquid and in solid form, both alone or as a constituent of an admixture, in particular of a dispersant or plasticizer. The invention therefore additionally relates to an admixture in liquid or solid form, comprising at least one polymer P according to the invention.

The admixture may contain an individual polymer P or a mixture of a plurality of different polymers P. However, it is also possible to use polymers P with other dispersants or plasticizers. The admixture may also contain further constituents. Examples of further constituents are solvents or additives, such as other plasticizers, for example lignosulfonates, sulfonated naphthalene-formaldehyde condensates, sulfonated melamine-formaldehyde condensates or polycarboxylate ethers (PCE), accelerators, retardants, shrinkage reducers, antifoams or foam formers.

Depending on preparation process or reaction procedure, the plasticizer or dispersant may contain free compounds of the starting materials, in particular free monohydroxy compounds, such as, for example, polyalkylene glycol, in particular free polyethylene glycol, in addition to the polymer P.

If the polymer P is used in liquid form, a solvent is preferably used for the reaction. Preferred solvents are, for example, hexane, toluene, xylene, methylcyclohexane, cyclohexane or dioxane and alcohols, in particular ethanol or isopropanol, and water, water being the most preferred solvent.

The polymer P may also be present in the solid state of aggregation. In the context of the invention, polymers in the solid state of aggregation are understood as meaning polymers which are present in the solid state of aggregation at room temperature and are, for example, powders, flakes, pellets, granules or sheets and can be transported and stored in this form without problems. The polymer P can be converted directly into the solid state of aggregation during the preparation or it is first prepared in liquid form and then converted, for example into powder form, for example by spray drying, with the aid of protective colloids or other drying agents.

If, according to the second process, the amine is added only in a second step, the amine can, for example, be initially introduced in a solvent, preferably water, and the product from the first reaction step can be added as polymer melt or in solid form, for example as powder or in the form of flakes, or of granules with stirring. For the use of solvents in the second stage, it is possible, if desired, to remove the solvent again, for example by applying a vacuum and/or heating, or further dilution can be effected. It is also possible for the amine, too, to be present in the solid state of aggregation or in or on a carrier material.

In a further aspect, the present invention relates to a binder-containing mixture comprising at least one hydraulically setting binder and at least one polymer P according to the invention. For example, cement, in particular Portland cements or high-alumina cements, and/or mixtures thereof with fly ashes, silica fume, slag, blast-furnace sands and limestone filler or quicklime, a latent hydraulic powder, an inert microscopic powder or gypsum are suitable as binders. The term "gypsum" includes any known form of gypsum, in particular calcium sulfate α-hemihydrate, calcium sulfate β-hemihydrate and calcium sulfate anhydrite. Preferably, concrete compositions or gypsum compositions are suitable as binder-containing mixtures.

Furthermore, the mixture may contain further aggregates, such as sand, gravel, stones, quartz powder, chalks and, as additives, customary constituents, such as other plasticizers, for example lignosulfonates, sulfonated naphthalene-formaldehyde condensates, sulfonated melamine-formaldehyde condensates or polycarboxylate ethers (PCE), accelerators, retardants, shrinkage reducers, antifoams or foam formers.

The polymer P is preferably used in an amount of from 0.01 to 10% by weight, based on the weight of the binder, in order to achieve the desired effect. It is also possible to use a plurality of polymers P as a mixture in order to achieve the desired effect.

In a further aspect, the present invention relates to a process for the preparation of a binder-containing mixture, the at least one polymer P being added separately or as a premixed admixture in solid or liquid form to the binder.

The addition of the polymer P in solid form is particularly suitable. Thus, the polymer P in the solid state of aggregation may be a constituent of a cement composition, a so-called dry mix, which is capable of being stored over a relatively long time and is typically packed in bags or stored in silos and is used. Such a dry mix can also be used after a relatively long storage time and has good flowability.

The polymer P can also be added to a customary concrete composition or gypsum composition together with or shortly before or shortly after the addition of the water. The addition of the polymer P in the form of an aqueous solution or dispersion, in particular as mixing water or as part of the mixing water, has been found to be particularly suitable here. The preparation of the aqueous solution or dispersion is effected by addition of water during the preparation of the polymer P or by subsequent mixing of the polymer P with water. Typically, the proportion of the polymer P is from 10 to 90% by weight, in particular from 20 to 50% by weight, based on the weight of the aqueous solution or dispersion. Depending on the type of the polymer P, a dispersion or a solution forms. A solution is preferred.

The polymer P according to the invention may be a constituent of an aqueous composition which is storage-stable over a relatively long time or it may be a constituent of a hydraulically setting composition. As a constituent of a hydraulically setting composition, the polymer P may be added to a customary hydraulically setting composition together with or shortly before or shortly after the addition of the water. The addition of the polymer P in the form of an aqueous solution or dispersion, in particular as mixing water or as part of the mixing water, has been found to be particularly suitable here.

The polymer P has particularly good properties as plasticizers for hydraulically setting compositions, in particular cementitious compositions, i.e. at water/cement (WlC) ratios customary in cement and concrete technology, the resulting mixture has substantially greater flow behavior in comparison with a composition without the plasticizer. The flow behavior is typically measured via the slump. On the other hand, it is possible to achieve mixtures which require significantly less water with the same flow behavior, so that the mechanical properties of the hardened hydraulically setting composition are greatly enhanced.

What is also surprising is that the polymer P according to the invention has good plasticizing properties both in concrete compositions and in gypsum compositions.

EXAMPLES

1. Preparation Method for Polymer P-1 According to the Invention, Prepared by Means of Polymer-Analogous Reaction 240 g of a 40 percent strength aqueous solution (corresponds to about 1 mol of acid units) of polymethacrylic acid (PMAA, having an average molecular weight $M_w$ of about 4500 g/mol) and 2.5 g of a 50 percent strength sulfuric acid were initially introduced into a round-bottomed flask having a mechanical stirrer (IKA® stirrer), thermometer, gas inlet tube and distillation bridge. The mixture was heated to 50° C. and 360 g of polyethylene glycol monomethyl ether (MPEG, having an average molecular weight $M_w$ of about 1000 g/mol) were added. The reaction mixture was heated to 175° C. under a stream of $N_2$. The water present in the mixture and the water of reaction were distilled off continuously under an $N_2$ stream. On reaching the temperature, 4.0 g of a 50 percent strength aqueous sodium hydroxide solution and 4.0 g of tetrahydrofurfuryl alcohol (THF—OH, obtainable from Fluka, Switzerland) were added to the reaction mixture and a vacuum of 80 mbar was applied. After 2½ hours, a complete reaction conversion is reached. The polymer melt was alternatively poured into aluminum dishes of about 100 mm diameter and about 7 mm height and allowed to solidify, or, after cooling to <100° C., 475 g of water were added in order to obtain a 50% strength polymer solution.

The polymers P-2 to P-12 were prepared in the same manner as polymer P-1, using the starting materials stated in Table 1. Polymethacrylic acid (PMAA, having an average molecular weight $M_w$ of about 4500 g/mol) as a 40 percent strength aqueous solution was used as the polycarboxylic acid, polyethylene glycol monomethyl ether having an average molecular weight $M_w$ of about 1000 g/mol (MPEG-1000) was used as monohydroxy compound F according to formula (IX), and tetrahydrofurfuryl alcohol (THF—OH) or tetrahydrofurfurylamine (THF—$NH_2$) or tetrahydrofurfurylpolyethylene glycol having an average molecular weight $M_w$ of about 200 g/mol, 1000 g/mol or 2000 g/mol (THF glycol 200, THF glycol 1000, THF glycol 2000) was used as tetrahydrofurfuryl compound G according to formula (X). The THF compounds are obtainable, for example, from Fluka, Switzerland, The Jeffamine® M-2070 (Jeffamine®), obtainable from Huntsman, was used as amine compound H according to formula (XI).

2. Preparation Method for Polymer P-13 According to the Invention, Prepared by Means of Free Radical Polymerization 8.8 g of sodium hyperphosphite dissolved in 500 g of deionized water were initially introduced into a 2000 ml round-bottomed flask having a mechanical stirrer, thermometer and reflux condenser and were heated to 85-90° C. As soon as the temperature was reached, the monomer mixture consisting of 535 g of a 50 percent strength aqueous solution of an ester of methacrylic acid with polyethylene glycol monomethyl ether ($M_w$ 1000 g/μmol, obtainable as Bisomer S10W from Cognis GmbH, Germany), 63 g of methacrylic acid, 4 g of tetrahydrofurfuryl methacrylate (both obtainable from Fluka, Switzerland) and 200 g of water and a solution of 2.4 g of sodium peroxodisulfate in 100 g of water were metered simultaneously by different metering pumps in the course of 2 hours. The reaction was allowed to continue at 85-90° C. until the peroxide test was negative.

3. Mortar Test

The efficiency of the polymers according to the invention was tested in mortar.

| Composition of the mortar mix (MM): (maximum particle size 8 mm) | Amount |
|---|---|
| Cement (Swiss CEM I 42.5) | 750 g |
| Limestone filler | 141 g |
| Sand 0-1 mm | 738 g |
| Sand 1-4 mm | 1107 g |
| Sand 4-8 mm | 1154 g |

The sands, the filler and the cement were dry-mixed for 1 minute in a Hobart mixer. The mixing water, in which 0.8% by weight, based on cement, of a 30% strength aqueous

TABLE 1

Polymers P-1 to P-12 according to the invention. The amounts of the individual units are stated in mol %, based on the total molar amount of all units of the polymer.

| Polymer | Polycarboxylic acid (mol %) | Compound F (MPEG-1000, mol %) | THF-compound G | Mol % of PET compound G | Amine compound H (Jeffamine ®, mol %) |
|---|---|---|---|---|---|
| P-1 | 71.47 | 25.73 | THF-OH | 2.80 | 0 |
| P-2 | 71.45 | 25.72 | THF-NH2 | 2.83 | 0 |
| P-3 | 72.46 | 26.09 | THF-glycol 200 | 1.45 | 0 |
| P-4 | 73.29 | 26.38 | THF-glycol 1000 | 0.33 | 0 |
| P-5 | 73.41 | 26.43 | THF-glycol 2000 | 0.16 | 0 |
| P-6 | 72.49 | 26.09 | THF-OH | 1.42 | 0 |
| P-7 | 72.48 | 26.09 | THF-NH2 | 1.43 | 0 |
| P-8 | 72.99 | 26.28 | THF-glycol 200 | 0.73 | 0 |
| P-9 | 73.41 | 26.43 | THF-glycol 1000 | 0.16 | 0 |
| P-10 | 73.47 | 26.45 | THF-glycol 2000 | 0.08 | 0 |
| P-11 | 69.52 | 25.03 | THF-OH | 5.45 | 0 |
| P-12 | 71.37 | 25.69 | THF-OH | 2.80 | 0.14 |

Abbreviations used:
PMAA = polymethacrylic acid;
MPEG-1000 = polyethylene glycol monomethyl ether having an average molecular weight $M_w$ of 1000 g/mol;
THF = tetrahydrofurfuryl.

solution of a polymer according to the invention was dissolved, was added in the course of 30 seconds and mixing was continued for a further 2.5 minutes. The 30% strength aqueous solution, which contains 30% by weight of the polymer according to the invention, also contains about 1% by weight of antifoam. The total wet mixing time was 3 minutes. The water/cement value (w/c value) was 0.44.

The slump of the mortar was determined according to EN 1015-3.

Comparative example C-1 is a conventional polycarboxylate ester (PCE) plasticizer, as described in Example 3 in EP0604676A1.

TABLE 2

Slump (SLU) in mm after 0, 30, 60 and 90 minutes (min).

| Polymer | SLU (mm) | | | |
|---|---|---|---|---|
| | 0 min | 30 min | 60 min | 90 min |
| P-1 | 225 | 215 | 216 | 213 |
| P-2 | 202 | 194 | 194 | 194 |
| P-3 | 220 | 210 | 203 | 204 |
| P-4 | 208 | 195 | 188 | 188 |
| P-5 | 205 | 192 | 192 | 193 |
| P-6 | 205 | 195 | 192 | 195 |
| P-7 | 204 | 186 | 190 | 186 |
| P-8 | 213 | 203 | 198 | 196 |
| P-9 | 206 | 198 | 194 | 192 |
| P-10 | 212 | 192 | 194 | 190 |
| P-11 | 196 | 196 | 200 | 194 |
| P-12 | 190 | 185 | 178 | 178 |
| P-13 | 238 | 216 | 212 | 198 |
| C-1 | 178 | 138 | 132 | 126 |

The results in Table 2 show that the polymers according to the invention have outstanding plasticizing properties compared with the conventional polymer C-1. This is shown in particular by the values of the slump after 30 to 90 minutes, i.e. the slump is relatively constant over 90 minutes. Particularly good results are obtained with polymers which are prepared via a polymer-analogous reaction and which use THF—OH as THF compound, for example polymers P-1, P-6 and P-11. Excellent results were also achieved with a polymer which was prepared via polymerization with a THF methacrylate, for example polymer P-13.

4. Flow Behavior in Calcium Sulfate α-Hemihydrate

For a gypsum slurry, the polymer was added in an amount defined according to Table 3 to 120 g of water, 300 g of calcium sulfate α-hemihydrate were then sprinkled in and stirring was effected for 1 minute at 1000 rpm. The slump was determined after 2, 5 and 10 minutes using a minicone having a diameter of 50 mm and a height of 51 mm and a capacity of about 100 ml. The end of stiffening (S-end) was determined according to EN 13279-2 using the Vicat needle apparatus according to DIN 1168. The end of stiffening (S-end) is reached when the depth of penetration of the immersion cone into the gypsum cake is <1 mm.

Comparative example C-2 is a commercially available gypsum plasticizer prepared on the basis of melamine (Melment® F15G from BASF).

TABLE 3

Slump (SLU) in mm and end of stiffening in minutes (min) and seconds (sec)

| | Dose (% by weight, based on calcium sulfate α-hemihydrate) | S end (min:sec) | SLU | | | | |
|---|---|---|---|---|---|---|---|
| | | | 2 min | 5 min | 10 min | 15 min | 20 min |
| none | | 20:00 | 117 | 106 | 82 | 50 | |
| C-2 | 0.2 | 32:00 | 178 | 178 | 175 | 170 | 155 |
| P-1 | 0.1 | 30:16 | 181 | 178 | 176 | 167 | 155 |
| P-3 | 0.1 | 24:30 | 177 | 175 | 165 | 101 | |
| P-4 | 0.1 | 25:40 | 170 | 173 | 163 | 143 | 50 |
| P-5 | 0.1 | 23:10 | 174 | 174 | 171 | 132 | |
| P-12 | 0.1 | 23:30 | 174 | 179 | 166 | 127 | |
| P-13 | 0.1 | 25:00 | 188 | 193 | 193 | 185 | 145 |

Table 3 shows that, in the pure gypsum slurry comprising calcium sulfate α-hemihydrate, the slump and hence the workability of the gypsum compositions which, according to the invention, contain the polymers P-1, P-3, P-4, P-5, P-12 or P-13 is very good, without retardation. The conventional melamine-based gypsum plasticizer (C-2) has the slump achieved with the polymers according to the invention only at twice the dose. In addition, the end of stiffening is delayed compared with polymers according to the invention.

5. Flow Behavior in Calcium Sulfate β-Hemihydrate

For a gypsum slurry, 136 g of water were initially introduced with the plasticizer in a dose stated according to Table 4, 200 g of calcium sulfate β-hemihydrate were then sprinkled in in the course of 15 seconds and the gypsum slurry was allowed to age for 45 seconds. Thorough stirring was then effected manually for 1 minute. The minicone having a diameter of 50 mm and a height of 51 mm was filled and the slump (SLU) was determined after 2 minutes and 15 seconds. The beginning of stiffening (S-beginning) was determined according to EN 13279-2 using the Vicat needle apparatus according to DIN 1168. The end of stiffening (S-end) was reached when the depth of penetration of the immersion cone into the gypsum cake is <1 mm.

TABLE 4

Slump (SLU) in mm and beginning of stiffening (S beginning) and end of stiffening (S end) in minutes (min) and seconds (sec)

| | Dose (% by weight, based on the calcium sulfate β-hemihydrate) | S beginning (min:sec) | S end (min:sec) | SLU in mm after 2:15 (min:sec) |
|---|---|---|---|---|
| none | | 07:15 | 15:30 | 190 |
| P-1 | 0.2 | 07:50 | 16:15 | 202 |
| P-2 | 0.2 | 07:20 | 14:20 | 204 |
| P-3 | 0.2 | 08:20 | 16:00 | 208 |
| P-4 | 0.2 | 07:50 | 15:30 | 208 |
| P-5 | 0.2 | 08:00 | 16:15 | 210 |
| P-12 | 0.2 | 09:25 | 20:00 | 212 |
| P-13 | 0.2 | 08:15 | 16:35 | 200 |
| C-1 | 0.2 | 11:30 | 24:00 | 192 |
| C-2 | 0.6 | 11:20 | 21:20 | 206 |

Table 4 shows that, in the pure gypsum slurry comprising calcium sulfate β-hemihydrate, the slump and hence the workability of the gypsum compositions which contain the polymers according to the invention is very good without retardation. In the case of the conventional plasticizers, in particular the beginning of stiffening and the end of stiffening are delayed (C-1, C-2) compared with the polymers used according to the invention. In addition, the conventional melamine-based gypsum plasticizer (C-2) has the slump achieved with the polymers according to the invention only in three times the dose.

Of course, the invention is not limited to the working examples shown and described. The abovementioned features of the invention can of course be used not only in the respective stated combination but also in other modifications, combinations and alterations or by themselves without departing from the scope of the invention.

The invention claimed is:
1. A plasticizer for hydraulically setting compositions or dispersant for aqueous dispersions comprising polymer P, the polymer P having ester groups and comprising:
   a) at least one structural unit A of the formula (I);

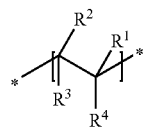
(I)

b) at least one structural unit B of the formula (II);

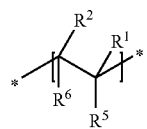
(II)

c) at least one structural unit C of the formula (III);

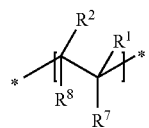
(III)

optionally
   d) at least one structural unit D of the formula (IV);

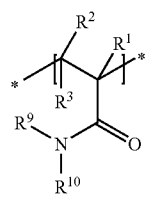
(IV)

and optionally
   e) at least one further structural unit E;
   $R^1$, independently of one another, being H, $CH_2COOM$ or an alkyl group having 1 to 5 carbon atoms, $R^2$, independently of one another, being H, an alkyl group having 1 to 5 carbon atoms, COOM or $CH_2COOM$;
   $R^3$, independently of one another, being H, $CH_3$, COOM or $CH_2COOM$; and
   $R^4$, independently of one another, being COOM; or
   $R^3$ together with $R^4$ forming a ring as —CO—O—CO—;
       M being H, a $C_1$-$C_5$ alkyl radical, alkali metal, alkaline earth metal or other di- or trivalent metal atoms, ammonium, an organic ammonium group or a mixture thereof;
   and $R^5$, independently of one another, being

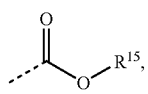

$R^{15}$ being —[$(R^{11}O)_x$—$(R^{12}O)_y$—$(R^{13}O)_z$]—$R^{14}$;
   $R^{11}$, $R^{12}$ and $R^{13}$, in each case independently of one another, being a $C_2$-$C_4$ alkylene group with an order of the ($R^{11}O$), ($R^{12}O$) and ($R^{13}O$) units in any possible sequence;
   $R^{14}$ being H, a $C_1$-$C_{12}$ alkyl or cycloalkyl radical, a $C_7$-$C_{20}$ alkylaryl or aralkyl radical, or a substituted or unsubstituted aryl radical; and
   x, y, z, independently of one another, each having the values 0-250 and x+y+z being 3-250;
   $R^6$, independently of one another, being H, $CH_3$, COOM, $CH_2COOM$ or a substituent as defined for $R^5$ or $R^7$;
   in which $R^7$, independently of one another, is a radical of the formula (V);

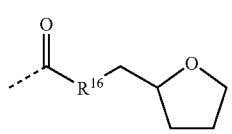
(V)

in which $R^{16}$, independently of one another, is NH, —NH—$(R^{17})_q$—, or —O—$(R^{18})_s$—,
   in which $R^{17}$ and $R^{18}$, in each case independently of one another, are a $C_1$-$C_{12}$ alkylene group or one or more $C_2$-$C_4$ oxyalkylene groups with an order in any possible sequence;
   in which q, independently of one another, is an integer and has the value 1 if $R^{17}$ is a $C_1$-$C_{12}$ alkylene group and in each case has the value 1-150 if $R^{17}$ is one or more $C_2$-$C_4$ oxyalkylene groups;
   in which s, independently of one another, is an integer and has the value 1 if $R^{18}$ is a $C_1$-$C_{12}$ alkylene group and in each case has the value 1-150 if $R^{18}$ is one or more $C_2$-$C_4$ oxyalkylene groups;
   $R^8$, independently of one another, being H, $CH_3$, COOM, $CH_2COOM$ or a substituent as defined for $R^5$ or $R^7$;
   $R^9$ and $R^{10}$ together forming a ring which optionally contains oxygen, sulfur or further nitrogen atoms, or
   $R^9$ and $R^{10}$, independently of one another, being H, a $C_1$-$C_{20}$ alkyl group, a $C_5$-$C_9$ cycloalkyl group, a $C_7$-$C_{12}$ aralkyl group, a hydroxyalkyl group or a compound of the formula (VI), (VII) or (VIII),

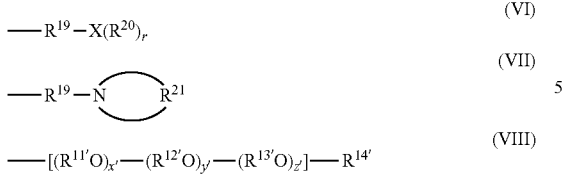

$R^{19}$, independently of one another, being an alkylene group and $R^{20}$, independently of one another, being a $C_1$- to $C_4$-alkyl group, and X, independently of one another, being an S, O or N, where r=1 if X=S or O, or r=2 if X=N;

$R^{21}$ being an alkylene group optionally having heteroatoms;

$R^{11'}$, $R^{12'}$ and $R^{13'}$, in each case independently of one another, being a $C_2$-$C_4$ alkylene group with an order of the $(R^{11'}O)$, $(R^{12'}O)$ and $(R^{13'}O)$ units in any possible sequence;

$R^{14'}$ being a $C_1$-$C_{12}$ alkyl or cycloalkyl radical, a $C_7$-$C_{20}$ alkylaryl or aralkyl radical, or a substituted or unsubstituted aryl radical; and x', y', z', independently of one another, having the values 0-100 and x'+y'+z'=1-100.

2. The plasticizer or dispersant as claimed in claim 1, wherein the polymer P is prepared by a polymer-analogous reaction from a polycarboxyl polymer and the respective alcohols and optionally amines.

3. The plasticizer or dispersant as claimed in claim 2, wherein the polymer P is prepared by the reaction of a) at least one polycarboxylic acid or analog of a polycarboxylic acid; and b) at least one monohydroxy compound F of the formula (IX)

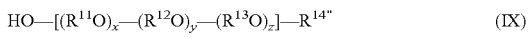

$R^{11}$, $R^{12}$ and $R^{13}$, in each case independently of one another, being a $C_2$-$C_4$ alkylene group with an order of the $(R^{11}O)$, $(R^{12}O)$ and $(R^{13}O)$ units in any possible sequence;

$R^{14''}$ being a $C_1$-$C_{12}$ alkyl or cycloalkyl radical, a $C_7$-$C_{20}$ alkylaryl or aralkyl radical, or a substituted or unsubstituted aryl radical;

x, y, z, independently of one another, each having the values 0-250 and x+y+z being 3-250; and c) at least one tetrahydrofurfuryl compound G of the formula (X)

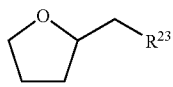

in which, $R^{23}$, independently of one another, is —$NH_2$, —$(R^{17})_q$—$NH_2$, or —$(R^{18})_s$—OH, in which $R^{17}$ and $R^{18}$, in each case independently of one another, are a $C_1$-$C_{12}$ alkylene group or one or more $C_2$-$C_4$ oxyalkylene groups with an order in any possible sequence;

in which q, independently of one another, is an integer and has the value 1 if $R^{17}$ is a $C_1$-$C_{12}$ alkylene group and in each case has the value 1-150 if $R^{17}$ is one or more $C_2$-$C_4$ oxyalkylene groups;

in which s, independently of one another, is an integer and has the value 1 if $R^{18}$ is a $C_1$-$C_{12}$ alkylene group and in each case has the value 1-150 if $R^{18}$ is one or more $C_2$-$C_4$ oxyalkylene groups; and optionally d) at least one amine compound H of the formula (XI)

and/or at least one amine compound H' of the formula (XI')

$R^{9'}$ and $R^{10'}$ together forming a ring which optionally contains oxygen, sulfur or further nitrogen atoms;

or $R^{9'}$ and $R^{10'}$, independently of one another, being H, a $C_8$-$C_{20}$ alkyl group, a $C_5$-$C_9$ cycloalkyl group, a $C_7$-$C_{12}$ aralkyl group or a compound of the formula (VI), (VII) or (VIII), $R^{9''}$ and $R^{10''}$ together forming a ring which optionally contains oxygen, sulfur or further nitrogen atoms;

or $R^{9''}$ and $R^{10''}$, independently of one another, being H, a $C_1$-$C_{12}$ alkyl group, a $C_5$-$C_9$ cycloalkyl group, $C_7$-$C_{12}$ aralkyl group, hydroxyalkyl group or a compound of the formula (VI), (VII) or (VIII),

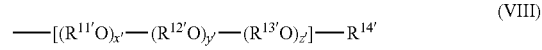

$R^{19}$, independently of one another, being an alkylene group and $R^{20}$, independently of one another, being a $C_1$- to $C_4$-alkyl group, and X, independently of one another, being an S, O or N, where r=1 if X=S or O, or r=2 if X=N;

$R^{21}$ being an alkylene group optionally having heteroatoms;

$R^{11'}$, $R^{12'}$ and $R^{13'}$, in each case independently of one another, being a $C_2$-$C_4$ alkylene group with an order of the $(R^{11'}O)$, $(R^{12'}O)$ and $(R^{13'}O)$ units in any possible sequence;

$R^{14'}$ being a $C_1$-$C_{12}$ alkyl or cycloalkyl radical, a $C_7$-$C_{20}$ alkylaryl or aralkyl radical, or a substituted or unsubstituted aryl radical;

x', y', z', independently of one another, each having the values 0-100 and x'+y'+z' being 1-100; and optionally e) at least one further compound J.

4. The plasticizer or dispersant as claimed in claim 3, wherein, the at least one polycarboxylic acid or the analog of a polycarboxylic acid is reacted with at least one monohydroxy compound F of the formula (IX) and at least one tetrahydrofurfuryl compound G of the formula (X) and optionally at least one amine compound H of the formula (XI) and optionally at least one further compound J at a temperature up to 200° C., so that anhydride groups form, and, in a second stage, the anhydride groups formed in the first stage are completely or partly reacted with an amine compound H' of the formula (XI') at temperatures substantially below 100° C. to give the amide.

5. The plasticizer or dispersant as claimed in claim 3, wherein the analog of the polycarboxylic acid is selected from the group consisting of acid salts, acid halides, acid anhydrides and acid esters.

6. The plasticizer or dispersant as claimed in claim 3, wherein the molecular weight of the at least one hydroxy compound F of the formula (IX) is about 120-20 000 g/mol, in particular about 250-10 000 g/mol.

7. The plasticizer or dispersant as claimed in claim 1, wherein the polymer P is prepared by a free radical polymerization reaction.

8. The plasticizer or dispersant as claimed in claim 7, wherein the polymer P is prepared by the polymerization reaction, in the presence of at least one free radical initiator, of
   a) at least one ethylenically unsaturated mono- or dicarboxylic acid M or an analog of an unsaturated mono- or dicarboxylic acid; with
   b) at least one ethylenically unsaturated carboxylic acid derivative K of the formula (XIII);

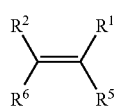
(XIII)

and
c) at least one second ethylenically unsaturated carboxylic acid derivative L of the formula (XIV);

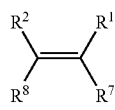
(XIV)

and optionally
d) at least one third ethylenically unsaturated carboxylic acid derivative N of the formula (XV);

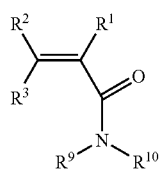
(XV)

and optionally
e) at least one further ethylenically unsaturated compound Q, $R^1$, independently of one another, being H, $CH_2COOM$ or an alkyl group having 1 to 5 carbon atoms, $R^2$, independently of one another, being H, an alkyl group having 1 to 5 carbon atoms, COOM or $CH_2COOM$;

$R^3$, independently of one another, being H, $CH_3$, COOM or $CH_2COOM$;

M being H, a $C_1$-$C_5$ alkyl radical, alkali metal, alkaline earth metal or other di- or trivalent metal atoms, ammonium, an organic ammonium group or a mixture thereof;

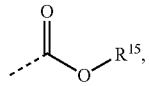

and $R^5$, independently of one another, being
$R^{15}$ being $-[(R^{11}O)_x-(R^{12}O)_y-(R^{13}O)_z]-R^{14}$;

$R^{11}$, $R^{12}$ and $R^{13}$, in each case independently of one another, being a $C_2$-$C_4$ alkylene group with an order of the ($R^{11}$O), ($R^{12}$O) and ($R^{13}$O) units in any possible sequence;

$R^{14}$ being H, a $C_1$-$C_{12}$ alkyl or cycloalkyl radical, a $C_7$-$C_{20}$ alkylaryl or aralkyl radical, or a substituted or unsubstituted aryl radical;

x, y, z, independently of one another, each having the values 0-250 and x+y+z being 3-250;

$R^6$, independently of one another, being H, $CH_3$, COOM, $CH_2COOM$ or a substituent as defined for $R^5$ or $R^7$;

$R^7$, independently of one another, being a radical of the formula (V);

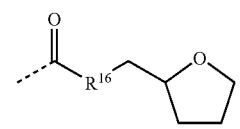
(V)

in which $R^{16}$, independently of one another, is NH, $-NH-(R^{17})_q-$, or $-O-(R^{18})_s-$, in which $R^{17}$ and $R^{18}$, in each case independently of one another, are a $C_1$-$C_{12}$ alkylene group or one or more $C_2$-$C_4$ oxyalkylene groups with an order in any possible sequence;

in which q, independently of one another, is an integer and has the value 1 if $R^{17}$ is a $C_1$-$C_{12}$ alkylene group and in each case has the value 1-150 if $R^{17}$ is one or more $C_2$-$C_4$ oxyalkylene groups;

in which s, independently of one another, is an integer and has the value 1 if $R^{18}$ is a $C_1$-$C_{12}$ alkylene group and in each case has the value 1-150 if $R^{18}$ is one or more $C_2$-$C_4$ oxyalkylene groups;

$R^8$, independently of one another, being H, $CH_3$, COOM, $CH_2COOM$ or a substituent as defined for $R^5$ or $R^7$;

$R^9$ and $R^{10}$ together forming a ring which optionally contains oxygen, sulfur or further nitrogen atoms, or $R^9$ and $R^{10}$, independently of one another, being H, a $C_1$-$C_{12}$ alkyl group, a $C_5$-$C_9$ cycloalkyl group, a $C_7$-$C_{12}$ aralkyl group, a hydroxyalkyl group or a compound of the formula (VI), (VII) or (VIII),

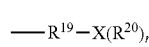
(VI)

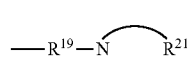
(VII)

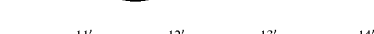
(VIII)

$R^{19}$, independently of one another, being an alkylene group and $R^{20}$, independently of one another, being a $C_1$- to $C_4$-alkyl group, and X, independently of one another, being an S, O or N, where r=1 if X=S or O, or r=2 if X=N;

$R^{21}$ being an alkylene group optionally having heteroatoms;

$R^{11'}$, $R^{12'}$ and $R^{13'}$, in each case independently of one another, being a $C_2$-$C_4$ alkylene group with an order of the ($R^{11'}$O), ($R^{12'}$O) and ($R^{13'}$O) units in any possible sequence;

$R^{14'}$ being a $C_1$-$C_{12}$ alkyl or cycloalkyl radical, a $C_7$-$C_{20}$ alkylaryl or aralkyl radical, or a substituted or unsubstituted aryl radical; and x', y', z', independently of one another, having the values 0-100 and x'+y'+z'=1-100.

9. The plasticizer or dispersant as claimed in claim 1, wherein $R^1$ is H or $CH_3$ and $R^2$, $R^3$ and M are H.

10. The plasticizer or dispersant as claimed in claim 1, wherein $R^6$ and $R^8$ are H.

11. The plasticizer or dispersant as claimed in claim 1, wherein $R^{16}$ is NH.

12. The plasticizer or dispersant as claimed in claim 1, wherein $R^{16}$ is $OR^{18}$ and $R^{18}$ is —$(CH_2CH_2O)_2$—.

13. The plasticizer or dispersant as claimed in claim 1, wherein $R^{11}$, independently of one another, is a $C_2$-alkylene group, $R^{12}$, independently of one another, is a $C_3$-alkylene group and $R^{13}$, independently of one another, is a $C_4$-alkylene group, and the order of ($R^{11}O$), ($R^{12}O$) and ($R^{13}O$) being random, alternating or blockwise.

14. The plasticizer or dispersant as claimed in claim 13, wherein $R^{15}$ comprises at least 30 mol % of ($R^{11}O$) units, based on the total molar amount of all ($R^{11}O$), ($R^{12}O$) and ($R^{13}O$) units.

15. The plasticizer or dispersant as claimed in claim 1, comprising from 5 to 95 mol %, of the structural unit A of the formula (I), from 1 to 90 mol %, of the structural unit B of the formula (II), from 0.001 to 10 mol %, of the structural unit C of the formula (III), optionally from 0 to 30 mol %, of the structural unit D of the formula (IV), and optionally from 0 to 30 mol %, of the structural unit E, based in each case on the total molar amount of the structural units of A, B, C, D and E in the polymer P.

16. The plasticizer for hydraulically setting compositions as claimed in claim 1.

17. The dispersant for aqueous dispersions as claimed in claim 1.

18. An admixture in liquid or solid form, comprising the plasticizer or dispersant as claimed in claim 1.

19. A binder-containing mixture comprising at least one hydraulically setting binder and the plasticizer as claimed in claim 1 in an amount of from 0.01 to 10% by weight, based on the weight of the binder.

20. The mixture as claimed in claim 19, wherein the binder is selected from the group consisting of cement, a latent hydraulic powder, one or more inert microscopic powders, gypsum and mixtures thereof.

21. The mixture as claimed in claim 19, wherein the mixture is concrete, mortar or gypsum.

22. A process for the preparation of the binder-containing mixture as claimed in claim 19, wherein the plasticizer is added separately or as a premixed admixture in solid or liquid form.

* * * * *